UNITED STATES PATENT OFFICE.

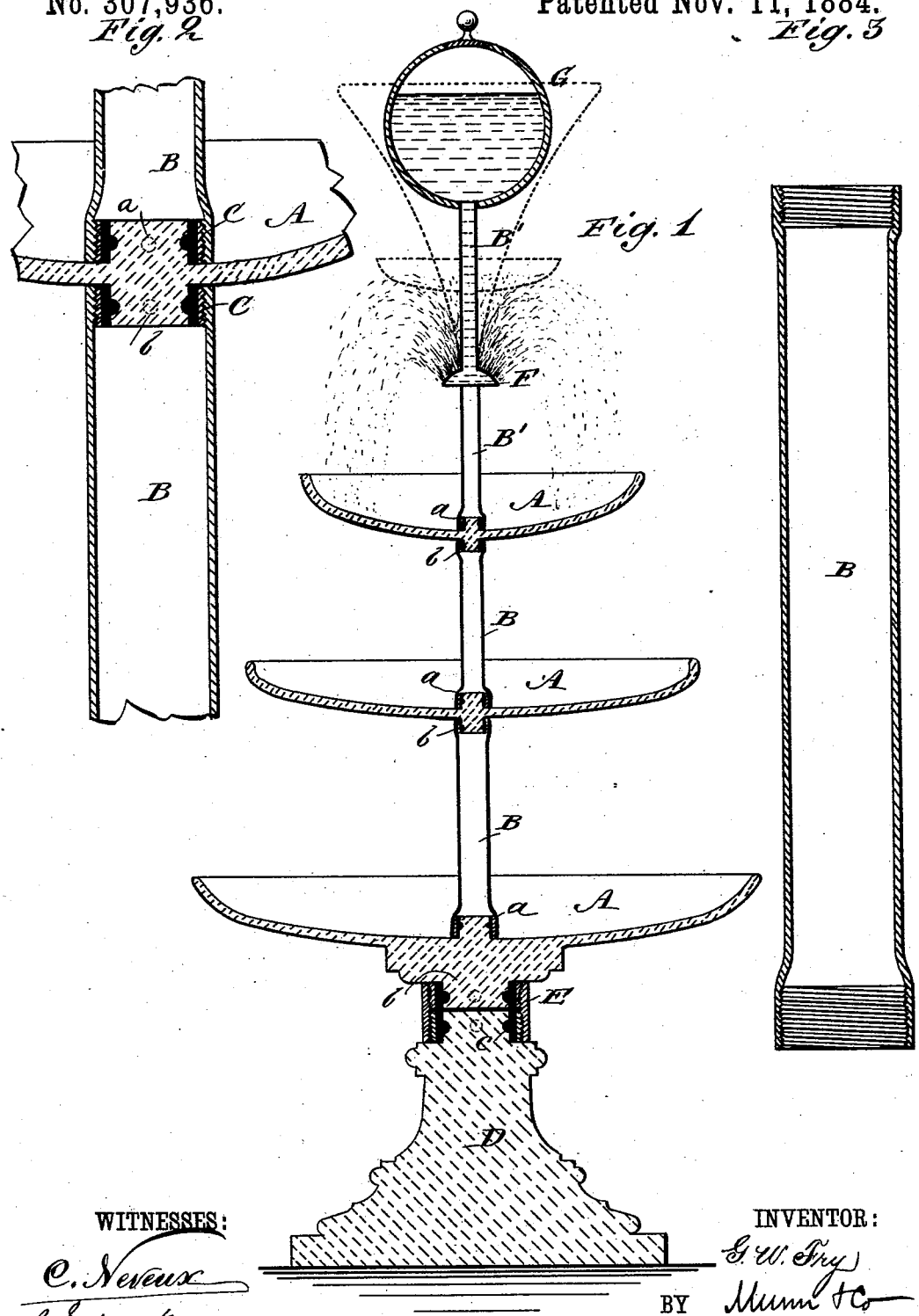

GEORGE W. FRY, OF BEAVER, PENNSYLVANIA.

FRUIT AND FLOWER STAND.

SPECIFICATION forming part of Letters Patent No. 307,936, dated November 11, 1884.

Application filed February 9, 1884. (No model.)

*To all whom it may concern:*

Be it known that I, GEORGE W. FRY, of Beaver, in the county of Beaver and State of Pennsylvania, have invented a new and Improved Fruit and Flower Stand, of which the following is a full, clear, and exact description.

The object of my invention is to provide a new and improved fruit and flower stand provided with a fountain or sprinkling attachment.

A further object of my invention is to provide a new and improved fruit and flower stand which is so constructed that it can be taken apart and folded very compactly for storage and shipment.

The invention consists in a fruit and flower stand formed of a series of bowls or dishes united by detachable standards.

The invention further consists in a sprinkler and a water-receptacle held on the uppermost stem, which is made hollow.

The invention also consists in parts and details of construction, as will be fully described and set forth hereinafter.

Reference is to be had to the accompanying drawings, forming part of this specification, in which similar letters of reference indicate corresponding parts in all the figures.

Figure 1 is a longitudinal sectional elevation of my improved fruit and flower stand. Fig. 2 is a detail sectional view of the same. Fig. 3 is a detail sectional view of one of the standards.

The fruit and flower stand is formed of a series of bowls or dishes, A, united by tubular standards B. Each bowl or dish A, which can be made of metal, glass, porcelain, or other material, is provided at the middle with bosses $a$ $b$ on the upper and lower surfaces, respectively, and around each boss a screw-threaded ring, C, is cemented or otherwise secured; or the screw-threads can be formed in the surfaces of the bosses. The tubular standards B may have their ends enlarged, and are screw-threaded internally, and have their lower end screwed on the boss $a$ of one dish or bowl A, and the lower boss, $b$, of the next bowl or dish above it screwed onto the upper end of the standard or tube, as shown. The tubes B can be made of metal, glass, or porcelain, or other suitable material.

On the upper end of the standard of the base D a screw-threaded ring, C, is secured, and a sleeve, E, is screwed on the upper end of the said base-standard and on the bottom boss, $b$, of the lowest bowl or dish, A, whereby the lowest bowl or dish and the base will be united.

The several parts forming the stand can be made separately in large quantities, and can then be united, thus greatly reducing the risk of breakage in making the stands. As the several parts can be taken apart readily, the stand can be packed very compactly for storage or shipping. A cup or disk can be secured on the stem B', projecting from the uppermost dish or bowl A on the said stem, which stem can be made hollow down to a circular or like nozzle or sprinkler, F, secured on the said stem and in communication with the hollow of the stem. A hollow spherical or other water or liquid receptacle, G, is held on the upper end of the stem B'. If the said receptacle is filled with water, &c., the liquid will be sprinkled over the flowers, fruits, &c., on the dishes or bowls A, as shown.

Having thus described my invention, I claim as new and desire to secure by Letters Patent—

1. A fruit and flower stand formed of a series of dishes or bowls united by standards screwed on the dishes or bowls, substantially as herein shown and described.

2. A fruit and flower stand formed of a series of dishes or bowls, each having a boss on the upper and lower surface at the middle, on which bosses the ends of tubular standards are screwed, substantially as herein shown and described.

3. In a fruit and flower stand, the combination, with a series of bowls, each having a boss on the upper and lower surfaces at the middle, of screw-threaded rings held on the bosses, and of standards screwed on the rings, substantially as herein shown and described.

4. In a fruit and flower stand, the combination, with a series of bowls or dishes, A, united by standards B, of the base D, and the sleeve B, screwed on the upper end of the base and on the boss $b$ on the under side of the lowest bowl, substantially as herein shown and described.

5. A fruit or flower stand formed of a series of dishes or bowls united by standards, and provided with a sprinkling attachment held above the uppermost dish or bowl, substantially as herein shown and described.

6. A fruit and flower stand formed of a series of dishes or bowls united by standards, and provided with a tubular stem projecting upward from the uppermost dish or bowl, and a sprinkling attachment held on the said stem, and a water-receptacle on the said stem and above the sprinkling attachment, substantially as herein shown and described.

GEO. W. FRY.

Witnesses:
 OSCAR F. GUNZ,
 C. SEDGWICK.